J. FLEURY.
FEED BOX.
APPLICATION FILED FEB. 28, 1913.
1,096,703.
Patented May 12, 1914.
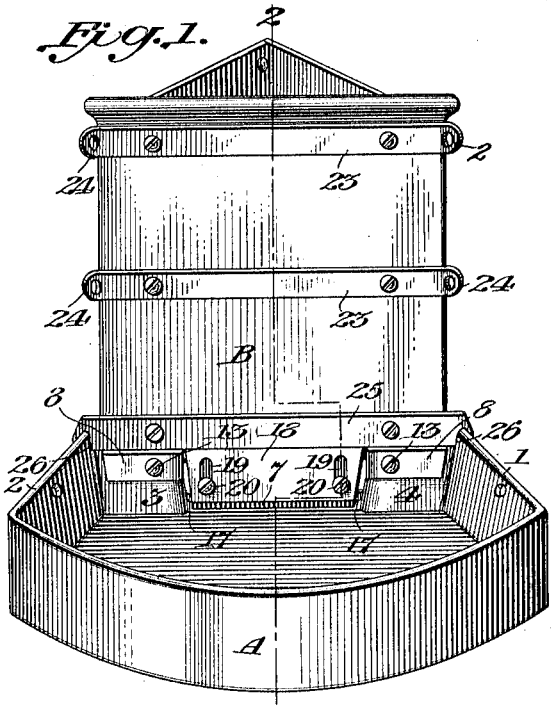
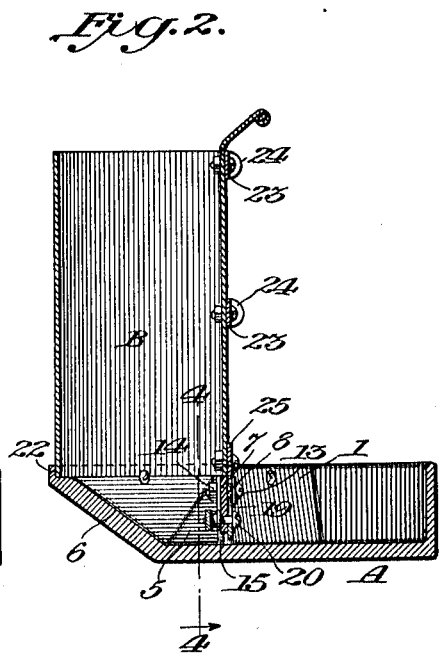
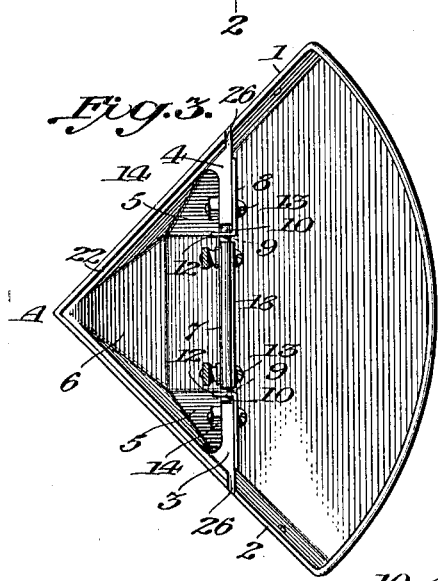
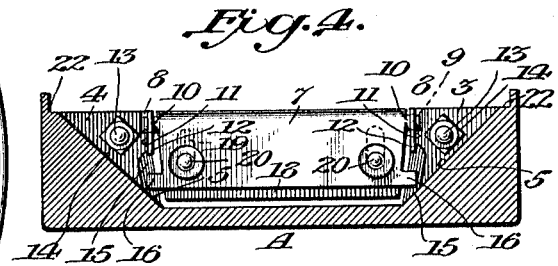
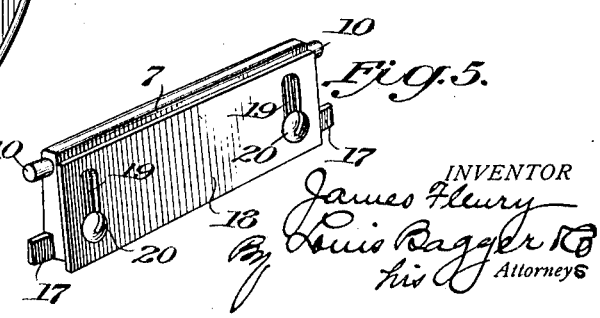
WITNESSES
Ruth B. King
A. A. Hammond
INVENTOR
James Fleury
By Louis Bagger & Co
his Attorneys

UNITED STATES PATENT OFFICE.

JAMES FLEURY, OF LINDSAY, ONTARIO, CANADA.

FEED-BOX.

1,096,703.  Specification of Letters Patent.  Patented May 12, 1914.

Application filed February 28, 1913. Serial No. 751,273.

*To all whom it may concern:*

Be it known that I, JAMES FLEURY, a subject of the King of Great Britain, residing at Lindsay, Province of Ontario, in the Dominion of Canada, have invented certain new and useful Improvements in Feed-Boxes, of which the following is a specification.

My invention relates to an improvement in corner feed boxes, and the object is to provide a feed-box for horses and other stock in which a valve or gate, adapted to be operated by the pressure of the nose of the animal while eating controls the supply of feed from the feed-hopper to the feed trough.

Another object is in the manner of supporting the valve or gate between the feed hopper and trough for regulating the supply of feed to the trough.

The invention consists of certain novel features of construction and combinations of parts which will be hereinafter described and pointed out in the claims.

In the accompanying drawings:—Figure 1 is a perspective view of the invention; Fig. 2 is a vertical sectional view on the line 2—2 of Fig. 1; Fig. 3 is a top plan view of the trough with the hopper removed; Fig. 4 is an enlarged detail sectional view on the line 4—4 of Fig. 2, showing the engagement between the lugs on the valve with the partitions; Fig. 5 is a perspective view of the valve.

A, represents the feed trough, which is preferably made in the shape of a sector, and 1 and 2 are the sides. The sides are disposed at right angles to each other, and are adapted to be connected to the wall or corner of a stall for the purpose of supporting the feed box. Diagonally disposed partitions 3 and 4 extend from the sides 1 and 2 in such a manner that an opening is provided from the corner of the trough to the larger portion. The bottom of the trough in the immediate rear of the partitions 3 and 4 is sloped from the sides 1 and 2 as at 5, in such a manner that any grain or other material falling upon this surface will be thrown behind the opening, and the bottom at the juncture between the sides 1 and 2 is sloped toward the opening as at 6. These sloping surfaces insure the grain or other material being discharged to the opening between the partitions, so that the grain will feed into the larger portion of the feed box where it can be consumed.

A valve 7 is supported between the ends of the partitions 3 and 4 by brackets 8, 8. The brackets are provided with openings 9 in which trunnions 10 on the valve are received. Recesses 11 are formed in the ends of the partitions 3 and 4 in which the right angular portions 12 of the brackets are received. Bolts 13 pass through the brackets and partitions for supporting the brackets on the partitions, and nuts 14 are screwed onto the ends of the bolts for rigidly fastening the brackets in place.

The partitions 3 and 4 are provided with beveled surfaces 15 at their ends along the lower inner edges. Lugs 16 formed on the inner side of the valve 7 are provided with beveled surfaces 17, which beveled surfaces engage the beveled surfaces 15 of the partitions for forming a connection whereby the valve will hang vertically between the ends of the partitions. The lugs 16 prevent the valve from swinging outward, and as the gate closes by gravity after it has been swung inward, by the nose of the animal forcing it inward, for the purpose of causing the grain to be discharged into the larger portion of the trough where the grain can be consumed, the lugs will engage the partitions as the valve swings between the ends of the partitions and prevent the valve from swinging outward.

A sliding gate 18 is supported on the front side of the valve, which is adapted to be adjusted below the lower edge of the valve for regulating the amount of grain to be discharged. The gate is provided with elongated slots 19, 19 and passing through the slots and valve are bolts 20, 20 for the purpose of supporting the gate upon the valve. Nuts 21 are screwed onto the ends of the bolts 20 for fastening the gate in any of its adjusted positions. Of course, on some occasions this gate will not be used, and in such instances it will be raised above or even with the lower edge of the valve.

A seat 22 is formed along the upper edges of the sides 1 and 2 in rear of the partitions for supporting a hopper B which is constructed, preferably, of sheet metal and is in the form of a right angular triangle in top plan. The hopper has secured to its front side horizontal bars 23, which bars are provided with ears 24 for the purpose of supporting the hopper on the wall of the stall. A bar 25 is provided along the lower edge of the hopper, and the outer ends of the bars are received in slots 26 in the sides 1 and 2 for fastening the hopper to the feed box.

It will be seen from the foregoing that the grain is discharged from the hopper into the trough in the rear of the partitions 3 and 4, and as the grain enters the trough it will be fed toward the valve by the sloping surfaces 5 and 6, so that upon the swinging inward of the gate, by the pressure of the animal's nose against it, the grain will flow past the valve and into the feed trough where it can be consumed. In this way, the animal is prevented from bolting the feed, which is the cause of indigestion and other ailments that have too often resulted in the death of valuable stock. Furthermore, there can be no waste of the feed, and the animal is prevented from throwing the feed all over the stall while eating, and no more feed reaches the horse or animal than what it really needs. The trough is sanitary and can be easily cleaned, as it will be constructed of some suitable metal.

What I claim as new and desire to secure by Letters Patent, is:—

1. In a feed box, the combination with a feed-trough and a hopper terminating at its lower end in the rear of the trough, of partitions dividing the trough from the lower end of the hopper and having an opening between their inner ends, the inner ends having the inner surfaces thereof beveled, brackets supported on the partitions, a valve pivotally supported on the brackets and located between the ends of the partitions, and lugs on the valve provided with beveled faces adapted to engage the beveled surfaces of the partitions to prevent the valve from swinging from the hopper to the feed-trough.

2. In a feed box, the combination with a feed-trough and a hopper, of partitions for separating the hopper from the feed-trough, and having an opening formed between the ends thereof, said partitions having recesses in the ends thereof, brackets supported on the partitions having the ends thereof extending into the recesses, a valve located between the ends of the partitions having trunnions, said trunnions mounted on the brackets for supporting the valve, lugs on the valve adapted to engage the partitions for preventing the valve from swinging into the feed-trough, and a sliding gate adjustably supported on the valve for regulating the amount of grain to be discharged from the hopper into the feed-trough.

3. In a feed box, the combination with a feed-trough and a hopper, of partitions for separating the hopper from the feed-trough and having an opening formed between the ends thereof, said partitions having recesses in the ends thereof, brackets supported in the sides of the partitions and having the ends thereof bent around the ends of the partitions and received in the recesses of the partitions, a valve located between the ends of the partitions having trunnions, said trunnions mounted on the ends of the brackets received in the recesses for supporting the valve.

In testimony whereof I affix my signature, in the presence of two witnesses.

JAMES FLEURY.

Witnesses:
LEIGH R. KNIGHT,
D. L. LATHANGUE.

---

Copies of this patent may be obtained for five cents each, by addressing the "Commissioner of Patents, Washington, D. C."